United States Patent
Tanaka

[19]

[11] Patent Number: 5,940,532
[45] Date of Patent: Aug. 17, 1999

[54] APPARATUS FOR AND METHOD OF RECOGNIZING HAND-WRITTEN CHARACTERS

[75] Inventor: Hidekazu Tanaka, Tokyo, Japan

[73] Assignee: Sony Corporation, Tokyo, Japan

[21] Appl. No.: 08/664,517

[22] Filed: Jun. 17, 1996

[30] Foreign Application Priority Data

Jun. 20, 1995 [JP] Japan ............................. P07-153454

[51] Int. Cl.⁶ ....................................................... G06K 9/18
[52] U.S. Cl. ............................................. 382/185; 382/187
[58] Field of Search ............................. 382/185, 187, 382/228, 231, 259

[56] References Cited

U.S. PATENT DOCUMENTS

| | | | |
|---|---|---|---|
| 4,531,231 | 7/1985 | Crane et al. | 382/185 |
| 4,672,677 | 6/1987 | Yamakawa | 382/185 |
| 5,555,317 | 9/1996 | Anderson | 382/159 |
| 5,649,027 | 7/1997 | Mahajan et al. | 382/185 |

*Primary Examiner*—Amella Au
*Assistant Examiner*—Samir Ahmed
*Attorney, Agent, or Firm*—Jay H. Maioli

[57] ABSTRACT

A hand-written character recognition apparatus can enhance recognition efficiency by decreasing erroneous recognition caused by habit of user's hand-writing stroke. In a hand-written character recognition apparatus in which user's strokes entered by some suitable means, such as light pen or tablet, are detected, then processed by a character recognition preprocessing, then processed by a recognizing processing for selecting nominated characters based on a standard evaluation point and further, processed by a post-recognizing processing and then supplied to an application device (electronic notebook, electronic dictionary, word processor, personal computer or the like). Characters causing erroneous recognition due to user's hand-writing stroke habit are subtracted from the standard evaluation point according to a demerit system by use of a nominated character dictionary in which evaluation points based on standard strokes for recognition processing are written and a minus-dictionary in which user's hand-writing stroke habits are written.

3 Claims, 4 Drawing Sheets

| Nominated Characters | Characters of Recognized Result | Evaluated Points | Minus-Dictionary | Total Evaluated Values |
|---|---|---|---|---|
| 1st Nominated Character | 什 | 88 | -50 | 38 |
| 2nd Nominated Character | け | 75 | 0 | 7 5 ⇒ To 1st Nominated Character |
| 3rd Nominated Character | H | 47 | 0 | 47 |
| 4th Nominated Character | 氏 | 39 | 0 | 39 |

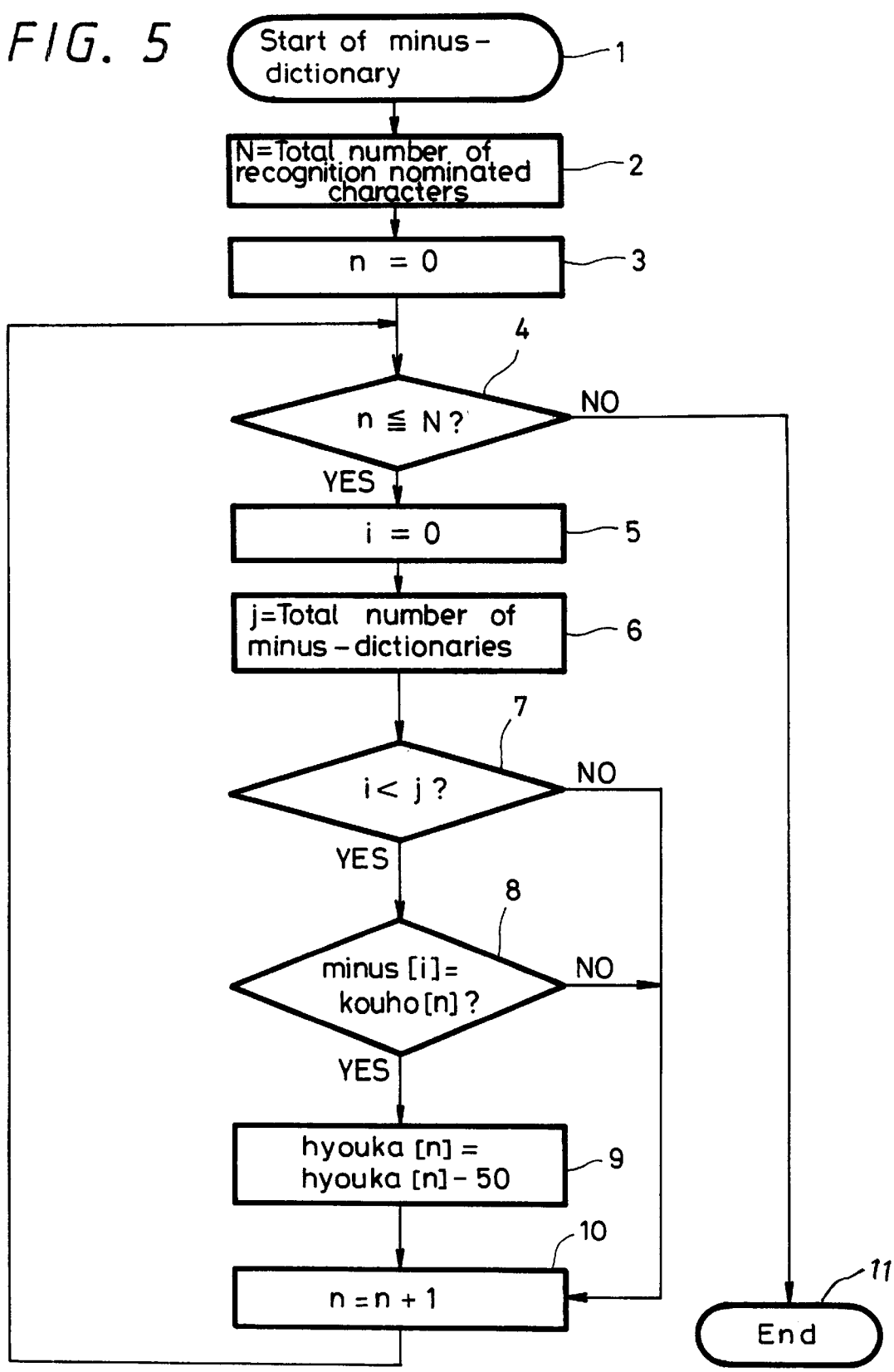

APPARATUS FOR AND METHOD OF RECOGNIZING HAND-WRITTEN CHARACTERS

BACKGROUND OF THE INVENTION

1. Field of the Invention

The present invention relates to an apparatus for and method of recognizing hand-written characters to prevent a character, whose frequency of use is low and which is erroneously recognized easily, from being erroneously recognized by intentionally decreasing an evaluated value of the character when an input hand-written character is recognized, and particularly to an apparatus for and method of recognizing hand-written characters in which a special dictionary or a so-called minus dictionary for decreasing the evaluated value of the hand-written character upon recognizing the hand-written character is provided.

2. Description of the Related Art

Recently, a hand-written character recognizing apparatus or the like has received a remarkable attention as easy handling input apparatus instead of a keyboard in a technical field of an electronic note book or portable computer, electronic dictionary, personal computer and so on.

FIG. 1 is a block diagram showing an arrangement of the hand-written character recognizing apparatus.

As shown in FIG. 1, the hand-written character recognizing apparatus of this example investigates the hand writing of a character entered by a light pen or a tablet through a hand-written character input apparatus 1, recognizes the character by a recognition processing apparatus 3 and inputs the recognition result into an application apparatus 6. Before and after the recognition processing apparatus 3 there are provided a recognition pre-processing apparatus 2 and a recognition post-processing apparatus 5, respectively. The recognition pre-processing apparatus 2 carries out such a processing that the output or hand-writing from the hand-written character input apparatus 1 is converted into a type to be easily recognized. A character corresponding to the handwriting thus processed by the pre-processing apparatus 2 is recognized in the recognition apparatus 3 by using a recognition dictionary. On the other hand, the recognition post-processing apparatus 5 determines whether or not the recognized result by the recognition apparatus 3 is correct. If the recognized result thereby is incorrect, then the result is corrected or recognized again.

Then, the character, which has been recognized as above, is input to the application apparatus 6 such as the portable computer, electronic dictionary, personal computer or the like to be utilized in accordance with object, use and so on thereof.

FIG. 2 is a block diagram showing a schematic arrangement of an apparatus which is used to execute the character recognition processing according to the present invention.

According to this apparatus, a character to be recognized is entered by a tablet 20 or a keyboard, shown by a broken-line block 25, to a processing apparatus or central processing unit (CPU) 21, which then recognizes the input character by using information necessary for recognition stored in a ROM 22. A recognized result is displayed on a display device 23 and also stored in a RAM 24.

Although the conventional character recognition apparatus has been roughly described, its hand-written character recognizing rate is low and hence its hand-written character recognizing rate does not reach a level for a practical use. Therefore, it is highly desired that hand-written character recognizing accuracy is improved for new group of products which utilize a hand-written character recognizing apparatus.

By the way, since there are many types of Japanese characters, it can not be avoided that there appears a character which can not be recognized or is difficult to be recognized. In this aspect, there is already proposed such a system which is provided with a user's dictionary for hand-written characters. However, provision of such the dictionary is not so enough to remove problem of erroneous recognition for hand-written characters.

When, in order to remove the defect of the conventional apparatus, a new character dictionary is added by a user's dictionary for hand-written characters, recognition for a character which presents a problem before the user's dictionary is used can be normally recognized. On the other hand, a character, which can be normally recognized without any problem before the user's dictionary is used, is badly affected on its recognition.

SUMMARY OF THE INVENTION

Therefore, it is on object of the present invention to provide a hand-written character recognizing apparatus and method to remove the defect of the prior art and to remove a bad effect upon recognizing a character which can be normally recognized before an erroneous recognition counter measure is effected.

According to an aspect of the present invention, there is provided a character recognizing apparatus which comprises an evaluating means for evaluating accuracy of a character to be recognized as a specific character, and a decreasing means for decreasing an evaluated value evaluated by the evaluating means for a predetermined character.

According to another aspect of the present invention, there is provided a character recognizing method which includes the steps of a step for evaluating accuracy of a character to be recognized as a specific character, and a step for decreasing an evaluated value evaluated by the evaluating step for a predetermined character.

BRIEF DESCRIPTION OF THE DRAWINGS

FIG. 5 is a flowchart used to explain a manner in which a minus dictionary is used in the character recognition apparatus according to the present invention.

DESCRIPTION OF THE PREFERRED EMBODIMENT

An embodiment of a hand-written character recognizing apparatus employing a minus dictionary according to the present invention will be described with reference to FIGS. 3 to 5.

Figure 3:
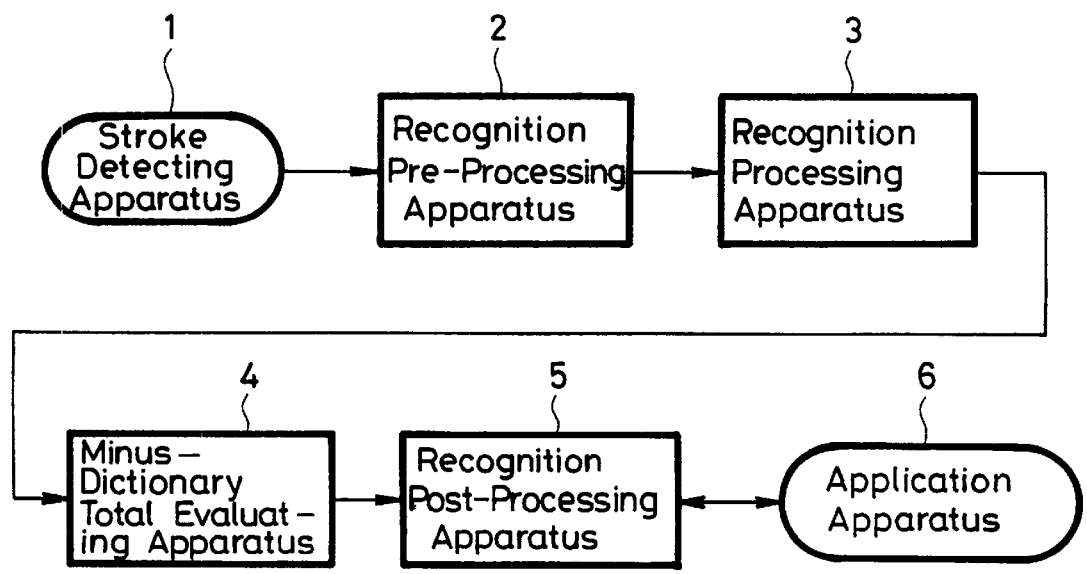
FIG. 3 is a block diagram showing an arrangement of an embodiment of a hand-written character recognizing apparatus according to the present invention.
Figure 4:
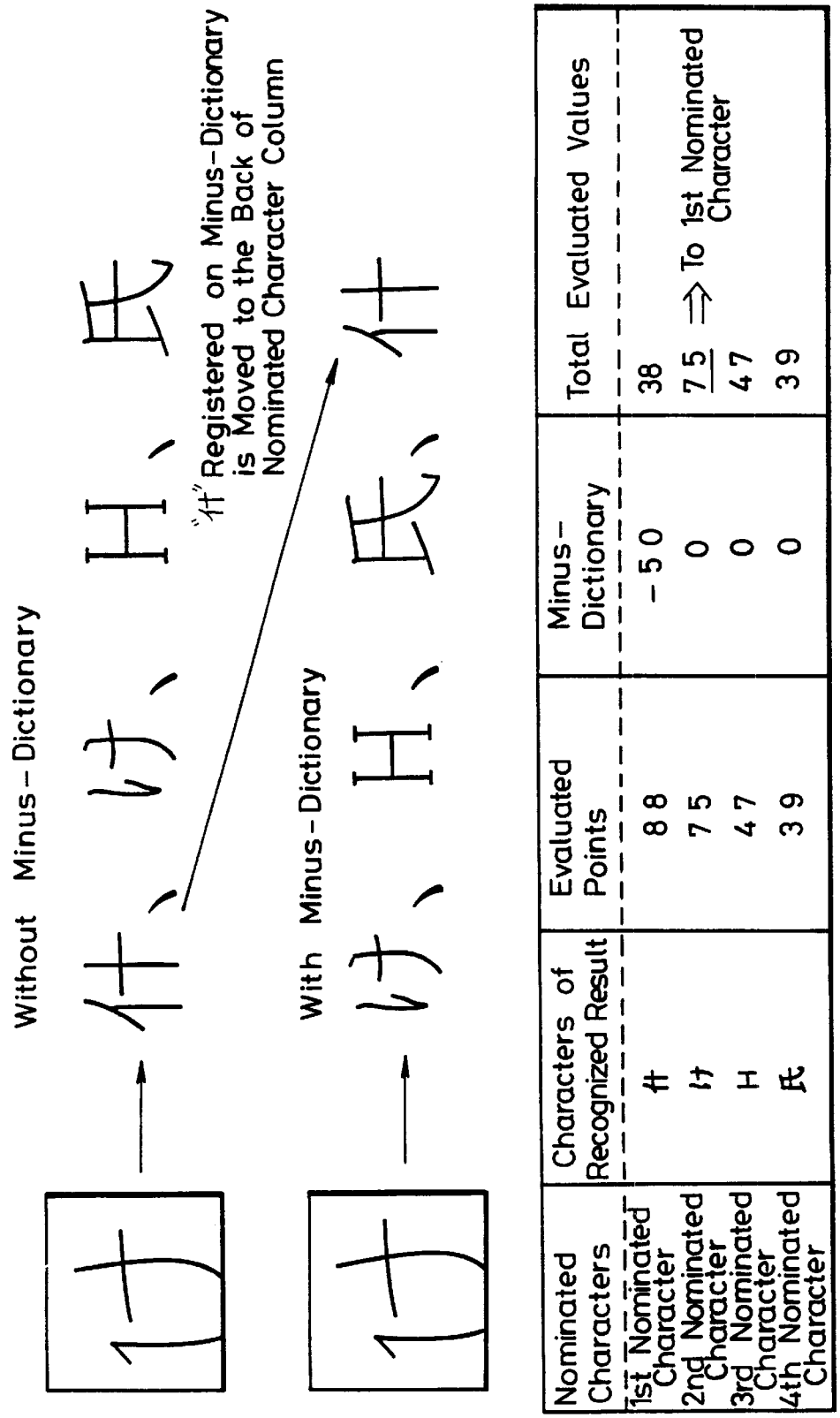
FIG. 4 is diagram used to explain a character recognition operation.

FIG. 3 is a block diagram showing an embodiment of the hand-written character recognizing apparatus according to the present invention. In FIG. 3, since the processes carried out by the handwritten character input apparatus 1, the recognition pre-processing apparatus 2, the recognition processing apparatus 3 and the recognition post-processing apparatus 5 and the input of the recognized result to the application apparatus 6 are the same those of FIG. 1, the explanation thereof will be omitted.

Figure 1:
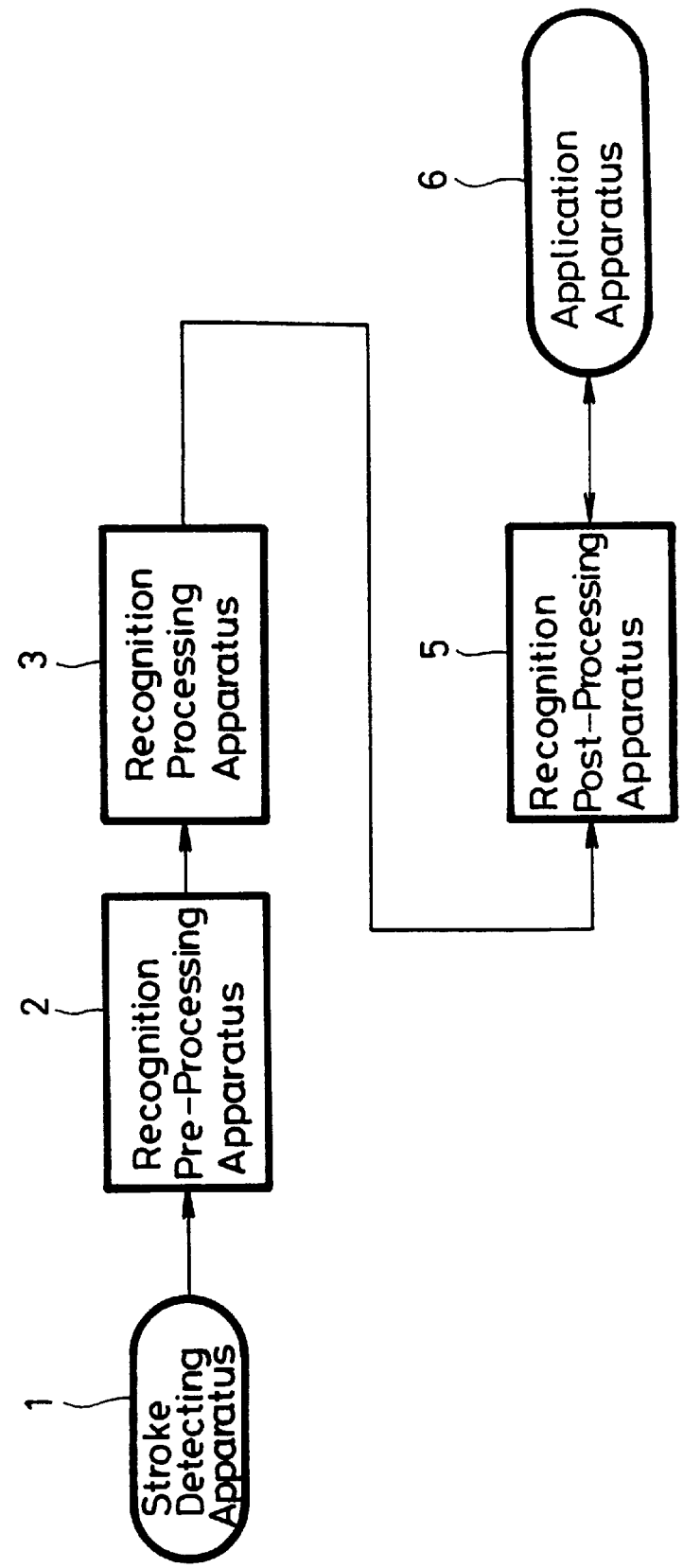
FIG. 1 is a block diagram showing a schematic arrangement of an apparatus which is used to execute a conventional character recognition.
Figure 2:
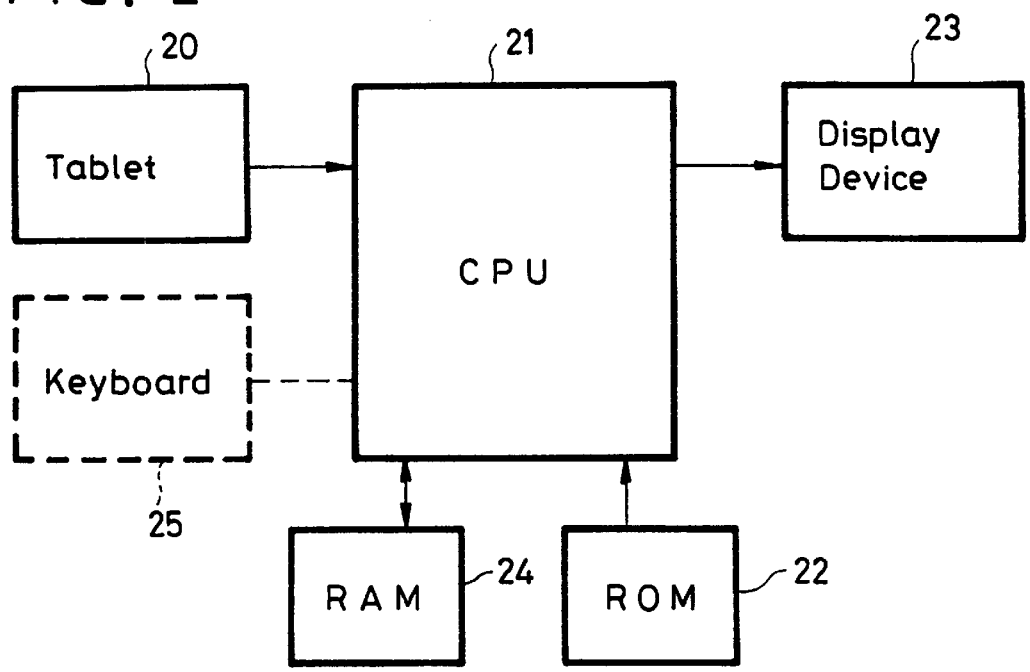
FIG. 2 is a block diagram showing a schematic in block diagram form of an apparatus used to execute character recognition processing according to the present invention.

A difference between the apparatus of the present invention shown in FIG. 3 and the conventional apparatus shown in FIG. 1 is that in the present invention a total evaluation apparatus 4 formed of a minus dictionary is provided between the recognition apparatus 3 and the recognition post-processing apparatus 5. Thus, the above difference will be described below.

It is natural that an erroneous recognition occurs in the character recognizing apparatus. Every person has a peculiar stroke habit on his hand-written character. Therefore, such a phenomenon easily appears that a specific user writes a certain character, a certain character different from a target character always appears erroneously.

Although a user writes, for example, a Japanese character "け", this Japanese character is erroneously recognized by the character recognition apparatus as a Chinese character "廾". In this case, a correct recognition nominated character "け" resides of course in a series of nominated characters corresponding to the input hand-written character "廾" in the dictionary of the recognition apparatus. However, as to the user's hand-writing, the Chinese character "廾" has a higher evaluation point than the Japanese Character "け" in the nominated characters. Thus, the Japanese character "け" becomes a secondary nominated character.

To avoid the above erroneous recognition, a minus dictionary is provided in the total evaluation apparatus 4. Upon recognition evaluation, a character registered in the minus dictionary is decreased from the evaluation point for a specific character and the result is totally evaluated. For example, in the above recognition, if the user registers the Chinese character "廾" in his minus dictionary, the Japanese character "け" becomes a first nominated character instead of the Chinese character "廾" which is seldom used.

The total evaluation by the total evaluation apparatus 4 using the minus dictionary shown in FIG. 3 serves to avoid an erroneous recognition for a character by the user's stroke habit on a character by provision of a minus dictionary which will be described later on.

The above processing will be described in detail with reference to FIG. 4. Now, it is assumed that a user manually inputs a Japanese character "け" by using a light pen, a tablet or the like. Then, due to the user's stroke habit on the hand-writing, there may be a case where a Chinese character "廾" appears as a primary or first nominated character.

Since a character which is input by the user truly is the Japanese character "け" and is not the Chinese character "廾", this recognition is wrong. Thus, when the user inputs the Japanese character "け" it is enough that the nominated character order of the Chinese character "廾" is lowered for the Japanese character "け" to be recognized.

The above nominated character order will be determined as follows. As will be clear from the lower row and the column of recognized character of the table shown in FIG. 4, the recognized results of the hand-written Japanese character "け" by the recognition apparatus 3 are such that the primary or first nominated character is the Chinese character "廾", the second nominated character is the Japanese character "け", the third nominated character is an alphabet "H" and the fourth nominated character is the Chinese character "氏". This order is determined by evaluation point of each character.

As described in the column of evaluation point for the nominated character on the same table, an evaluation point for the first nominated character "廾" is 88 and an evaluation point for the second nominated character "け" is 75, so that the hand-written Japanese character "け" is recognized as the Chinese character "廾". Therefore, when the hand-written Japanese character "け" is input by the user, in order that the character "け" is correctly recognized, if a value –50 is inscribed on the column of the minus dictionary at the raw corresponding to the first nominated character "廾", the total evaluation value of the character "廾" becomes 38 (88–50 =38). Thus, the nominated character "廾" becomes the fourth nominated character whose total evaluation value is the smallest value and hence the second nominated character "け" becomes the first nominated character.

The frequency in which Chinese character "廾" is used is usually low and this character is likely erroneously recognized for the user. Therefore, if a minus value is inscribed in the minus dictionary to decrease an evaluation value in accordance with the handwriting habit of each user, as described above, the efficiency of recognition can be increased.

When a character, the use frequency of which is low and which is erroneously recognized easily, is previously registered in the minus dictionary of the handwritten character recognizing apparatus to intentionally decrease the evaluation value of the character, erroneous recognition of a character can be avoided.

A practical use of the minus dictionary will be explained with reference to the flowchart of FIG. 5. As shown in FIG. 5, the minus dictionary is started to be referred at step 1. Then, a total number of recognition nominated character is set to a variable N. Then, a variable n is set to zero (n =0).

Next, in step 4 it is judged whether or not the variable n reaches the total number N of recognition nominates or n≦N. If the variable exceeds the total number (n>N), the processing proceeds to step 11 and then is ended. If n<N, the processing proceeds to step 5 and a variable i is set to zero (i=0).

Then, the processing proceeds to step 6 and the total number of minus dictionaries is set to a variable j. Then, the processing proceeds to step 7 where it is judged whether or not i<j is satisfied. If i reaches j, then the processing jumps to step 10.

If i does not reaches j, then it is checked in the next step 8 whether or not that character is registered in the minus dictionary. If the character is not registered in the minus dictionary, then the processing jumps to step 10. If the character is registered in the minus dictionary, then the evaluation value of the character is decreased in the next step 9. In this example, although the evaluation value is decreased by 50 as an example, the decreasing value may be changed depending on circumstances.

In step 10, n=n+1 is calculated so as to proceed to the next character in the minus dictionary. Then, processing returns to step 4. Thereafter, the processings through steps 4 to 10 will be repeated. Finally, n>N, namely, the variable exceeds the total number of nominated characters, the processing proceeds to step 11 and ended.

When a character, which is erroneously recognized, is a character which is not used frequently as in the above example (is this example "卄", such erroneous recognition can be substantially avoided by the provision of the minus dictionary.

As will be clear from the above description, according to the present invention, since there is prepared the minus dictionary which is used to decrease an evaluated value of a specific or predetermined nominated character of evaluated values of nominated characters described in the dictionary used for the hand-written character recognizing apparatus, a character which is difficult to be recognized before employing the minus dictionary can be normally recognized without badly affecting or interfering on a character which is normally recognized before using the minus dictionary.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A character recognizing apparatus using a minus dictionary, comprising:

evaluating means for evaluating an accuracy with which characters are recognized as specific characters and generating an evaluated value for each character; and decreasing means for decreasing said evaluated value generated by said evaluating means for predetermined characters, wherein said decreasing means includes:

means for counting a total number of characters registered in said minus dictionary, means for detecting whether a character is registered in said minus dictionary, means for decreasing said evaluated value of said character, and means for incrementing a counting value of characters to the total number of characters counted by said means for counting.

2. The character recognizing apparatus as claimed in claim 1, wherein said minus dictionary comprises a listing of characters which require decreasing their evaluation values by a predetermined constant.

3. A character recognizing method comprising the steps of:

evaluating accuracy of characters which are recognized as specific characters and generating an evaluated value for each; and decreasing said evaluated value generated in said evaluating step for predetermined characters, wherein said decreasing step includes the steps of:

counting a total number of characters registered in a minus dictionary, detecting whether a character is registered in said minus dictionary, decreasing said evaluated value of said character, and incrementing a counting value of characters to the total number of characters counted in said counting step.

* * * * *